United States Patent [19]

Miyamoto et al.

[11] Patent Number: 4,855,831
[45] Date of Patent: Aug. 8, 1989

[54] VIDEO SIGNAL PROCESSING APPARATUS

[75] Inventors: Fumitaka Miyamoto, Ibaraki; Daisaku Kato, Iwai, both of Japan

[73] Assignee: Victor Co. of Japan, Japan

[21] Appl. No.: 115,604

[22] Filed: Oct. 29, 1987

[30] Foreign Application Priority Data

Oct. 31, 1986 [JP]  Japan ................... 61-259879

[51] Int. Cl.$^4$ .................... H04N 5/272; H04N 9/74
[52] U.S. Cl. ..................... 358/183; 358/22; 340/721
[58] Field of Search ............ 358/182, 183, 22; 340/721

[56] References Cited

U.S. PATENT DOCUMENTS

| | | | |
|---|---|---|---|
| 4,591,897 | 5/1986 | Edelson | 358/182 |
| 4,599,611 | 7/1986 | Bowker et al. | 358/183 |
| 4,602,286 | 7/1986 | Kellar et al. | 358/183 |
| 4,638,360 | 1/1987 | Christopher et al. | 358/183 |
| 4,673,983 | 6/1987 | Sarugaku et al. | 358/183 |
| 4,712,130 | 12/1987 | Casey | 358/22 |

OTHER PUBLICATIONS

"Character Generator" by Phillip Kurz; Television Broadcast Apr. 1986, pp. 56–62.

*Primary Examiner*—Howard W. Britton
*Assistant Examiner*—John K. Peng
*Attorney, Agent, or Firm*—Lowe, Price, Leblanc, Becker & Shur

[57] ABSTRACT

A superimposing video signal represents a superimposing shape. The superimposing video signal and a background video signal are mixed at a varible mixing rate. During an interval where the superimposing video signal corresponds to an edge of the superimposing shape, the mixing rate is varied. The superimposing video signal may be stored in a memory. The mixing rate may be varied in accordance with a mixing rate signal stored in a memory.

6 Claims, 6 Drawing Sheets

VIDEO SIGNAL PROCESSING APPARATUS

BACKGROUND OF THE INVENTION

1. Field of the Invention

This invention generally relates to a video signal processing apparatus, and specifically relates to a video signal processing apparatus usable in a television opaque projector, a superimposing apparatus, or the like.

2. Description of the Prior Art

It is known to superimpose letters or pictures over images reproduced from video tape recorders (video tape reproducing devices) and television receivers. In some cases, the letters and still pictures to be superimposed are generated by computers. As a result, the superimposed letters or the still pictures tend to have jagged edges. This phenomenon is generally called "aliasing".

There are known anti-aliasing apparatuses which prevent jagged edges of superimposed letters and still pictures. The known anti-aliasing apparatuses are limited to be effective in the case of stationary background images but are generally ineffective in the case of moving background images such as video programs reproduced from a vido tape recorder.

SUMMARY OF THE INVENTION

It is an object of this invention to provide a video signal processing apparatus which can prevent jagged edges of superimposed letters or still pictures on moving background images.

In a video signal processing apparatus according to a first aspect of this invention, a superimposing video signal represents a superimposing shape, a shape to be superimposed. The superimposing video signal and a background video signal are mixed with each other at predetermined mixing rates depending on a location of each picture element which constitutes a border area between the shape and the background. In the border area, the superimposing video signal blends into the background video signal according to the predetermined mixing rates assigned to corresponding picture elements.

In a video signal processing apparatus according to a second aspect of this invention, a first memory holds the superimposing video signal representing the superimposing shape. A second memory holds a mixing rate signal representing mixing rates predetermined for respective picture element positions of the superimposing shape. Namely, the mixing rates change in value corresponding to the edge construction of the superimposed shape. A mixer is supplied with the superimposing video signal and the mixing rate signal from the first memory and the second memory respectively, and mixes the two signals at the mixing rate controlled by the mixing rate signal.

DESCRIPTION OF THE PREFERRED EMBODIMENT

Figure 1:
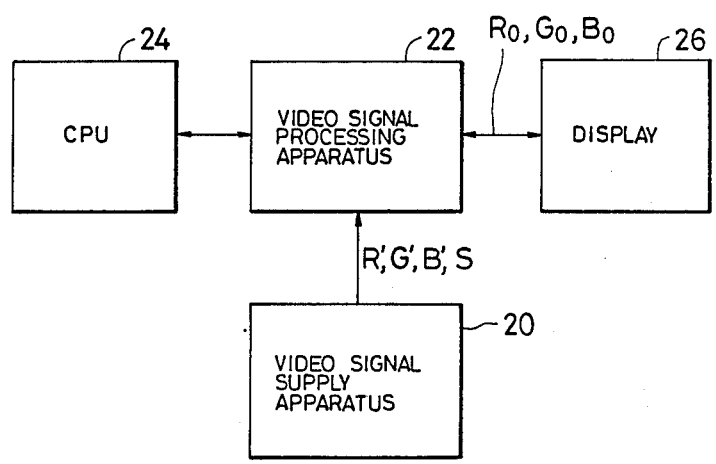
FIG. 1 is a block diagram of a video system including a video signal processing apparatus according to an embodiment of this invention.

With reference to FIG. 1, a video signal supply apparatus 20, such as a video tape recorder (a video tape reproducing device) or a television receiver, outputs continuously a video signal as a background picture and a sync signal S of the video signal to a video signal processing apparatus 22. The video signal is supplied to the apparatus 22 in a form of primary color signals, that is, red, green, and blue signals R', G', and B'. The video signal components R', G', and B' represent the background image.

The video signal processing apparatus 22 superposes additive color picture data R, G, and B stored in and suplied from a computer (CPU) 24 on the color background image data R', G', and B' respectively and thus derives processed color video signals Ro, Go, and Bo containing background data and superimposed data. The additive color picture data R, G, and B correspond to various shapes such as letters, characters, or still pictures. Superimposing picture data and their proprietary mixing data are preloaded into a computer 24 as a program data, then the data are transfered to the video signal processing apparatus 22 under the control of the computer 24. In this regard, there is a software known to the industry as the "FONT GENERATOR" developed by the present applicant. The software "FONT GENERATOR" when loaded into a proper hardware can generaate the data to be preloaded into the computer 24. In addition, the superimposing picture data and the mixing data written in the video signal processing apparatus 22 can be updated by the computer 24.

The processed color video signals Ro, Go, and Bo are outputted from the video signal processing apparatus 22 to a display 26 such as a cathode-ray tube or a printer. The display 26 reproduces and indicates images represented by the processed color video signals Ro, Go, and Bo. The indicated images have background portions corresponding to the background color video signals R', G' and B' and superimposed portions corresponding to the additive color picture data R, G, and B. A video signal recording apparatus may be used in place of the display 26.

Figure 2:
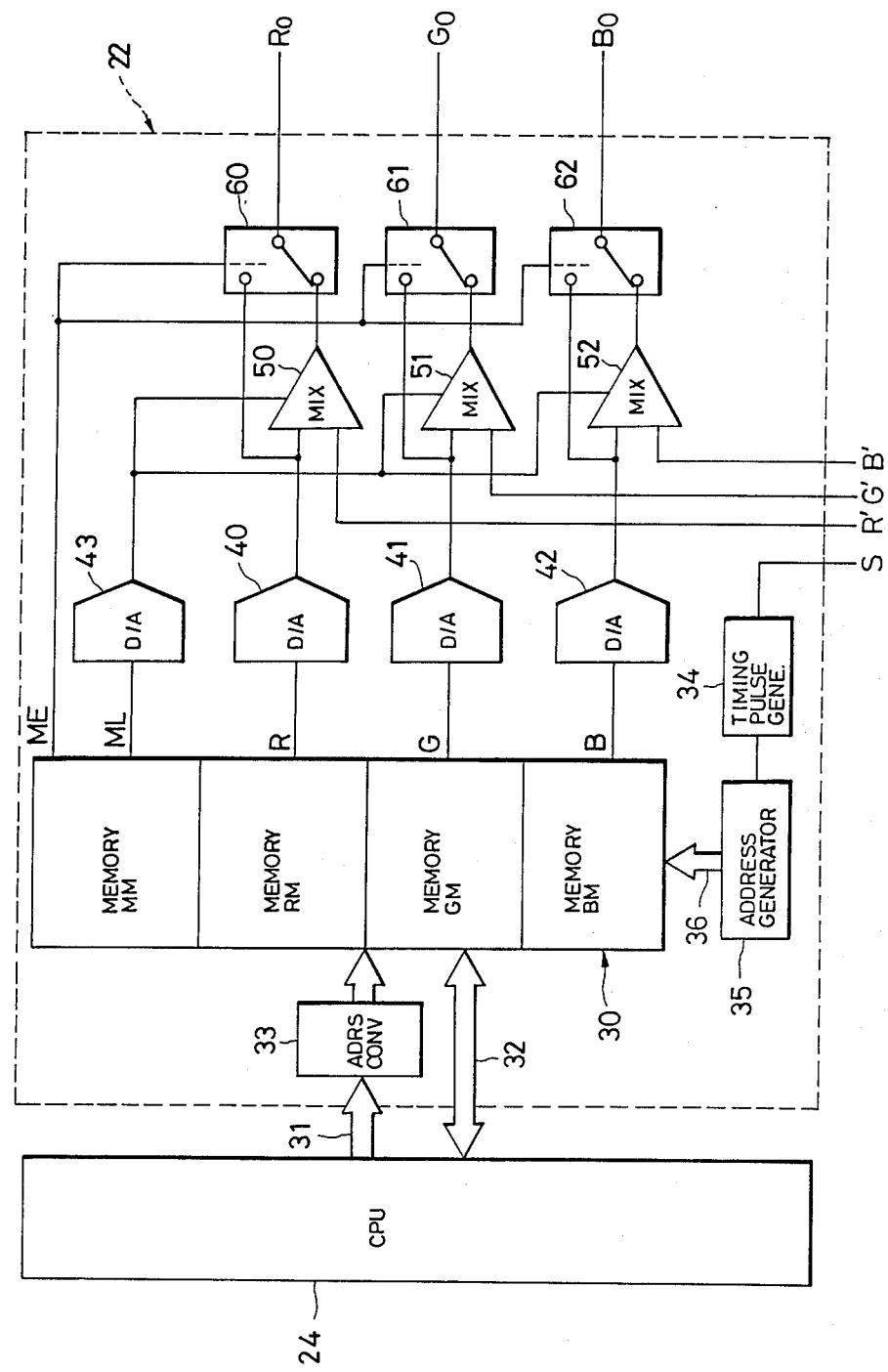
FIG. 2 is a block diagram of the video signal processing apparatus of FIG. 1.

As shown in FIG. 2, the video signal processing apparatus 22 includes a superimposing picture memory unit 30 composed of memories RM, GM, BM, and MM. Each of the memories RM, GM, and BM holds one frame of red, green, or blue superimposing picture data R, G, or B respectively. The memory MM holds mixing data containing mixing levels ML and mix-enabling instructions ME both correspond to the one frame of picture data. As previously described, the superimposing picture data R, G, B and their proprietary mixing data ML and ME are all preloaded into a computer 24 as a software before being transfered to the memories RM, GM, BM and MM.

The memory unit 30 is composed of 4 segments of random-access memory cells and each of the 4 sections is arranged in a two-dimensional configuration such that each horizontal row of cells corresponds to 768 picture elements of the superimposing picture and each vertical column of cells corresponds to 512 picture elements of the superimposing picture for example. One superimposing picture image having 768 picture elements in horizontal direction and 512 picture elements in vertical direction, and each of the picture elements being composed of 3 primary colors and their corresponding magnitudes, is stored in 3 segments of the memory unit 30 corresponding to the 3 primary colors. The remaining one segment of the memory unit 30 is for storing mixing data corresponding to each of the picture elements. The magnitude of each picture element is represented by 8 bits and a mixing data for each picture element is represented also by 8 bits, accordingly, each picture element is represented by 32 bits or 4 bytes which includes the mixing data.

The superimposing color picture data and the mixing data are generally loaded into the memory unit 30 from the computer 24. As described before, the computer 24 has the internal memory device in which predetermined superimposing color picture data and mixing data are stored. The computer 24 also reads out the superimposing picture data and the mixing data from the memory unit 30. The data writing to and the data reading out from the memory unit 30 are performed in units of 1 byte or 1 word for example.

As described previously, data for each picture element are 32 bits, which are divided into four sets of 8-bit data namely red picture data R, green picture data G, blue picture data B, and mixing data M respectively. In the 8-bit mixing data, 5 bits are assigned to represent a mixing level ML and 1 bit is assigned to represent a mix-enabling instruction ME.

Figure 3:
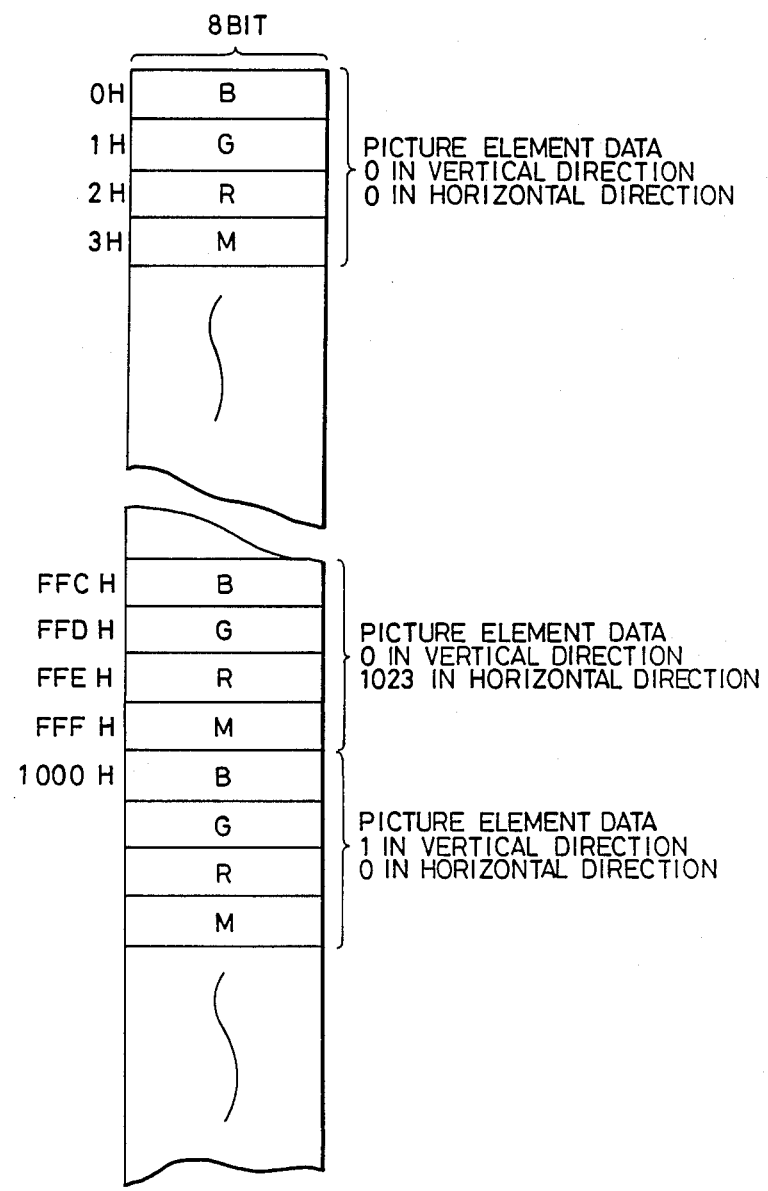
FIG. 3 is a diagram showing the relationship between addresses and superimposing picture data in the video signal processing apparatus of FIGS. 1 and 2.

As shown in FIG. 3, addresses of the segments of the memory unit 30 corresponding to the respective picture elements are numbered sequentially in vertical and horizontal directions.

As shown in FIG. 2, the computer 24 and the memory unit 30 are connected via an address bus 31 and a data bus 32. The computer 24 outputs an address signal to the superimposing picture memory unit 30 via an address converter 33 within the video signal processing unit 22. The address converter 33 makes the address signal from the computer 24 compatible with an address system of the video signal processing unit 22. The computer 24 writes and reads the superimposing picture data and the mixing data into and from the segments of the memory unit 30 denoted by the address signal. For example, the address signal has 21 bits. The transmission of the address signal is performed in unit of 1 byte.

The sync signal S from the video signal supply apparatus 20 is applied to a timing pulse generator 34 within the video signal processing apparatus 22. The timing pulse generator 34 supplies an address generator 35 with clocks which have the same frequency as the sync signal S. The device 35 generates an address signal in accordance with the clocks from the timing pulse generator 34. The address signal is outputted from the address generator 35 to the memory unit 30 via an address bus 36. After they are written into the memory unit 30, the superimposing color picture data and the mixing data are sequentially read from the memory unit 30 in accordance with the address signal supplied from the address generator 35.

Specifically, the superimposing red picture data R are sequentially read from the memory RM and transmitted to a digital-to-analog (D/A) converter 40. The superimposed green picture data G are sequentially read from the memory GM and transmitted to a D/A converter 41. The superimposed blue picture data B are sequentially read from the memory BM and transmitted to a D/A converter 42. The mixing levels ML are sequentially read from the memory MM and transmitted to a D/A converter 43. The mix-enabling instructions ME are sequentially read from the memory MM and transmitted to control terminals of switches 60, 61, and 62.

The data read out from the memories RM, GM, BM and MM is performed correspondingly through the four memories picture element by picture element basis and in synchronism with the sync signal S of the video signal so as to be segmented in the horizontal and vertical scanning rates of the video signal.

The data transmission from the memory unit 30 to the devices 40-43 and 60-62 is generally performed independent of the data transmission between the computer 24 and the memory unit 30. However, in order to avoid a collision, an arbitration between the memory access by the CPU 24 and the memory access by the address generator 35 is performed by a known system.

The D/A converters 40-43 transform the digital signals R, G, B, and ML into corresponding analog signals respectively. The analog output signals from the D/A converters 40, 41, and 42 representing the superimposing color picture data R, G, and B are applied to first input terminals (not shown) of mixers 50, 51, and 52 respectively. Second input terminals (not shown) of the mixers 50, 51, and 52 are subjected to the background color video signals R', G', and B' from the video signal supply apparatus 20 respectively. The analog output signal from the D/A converter 43 representing the mixing levels is applied to control terminals of the mixers 50-52. The device 50 mixes the background red video signal R' and the superimposing red picture signal at a mixing rate corresponding to the mixing level represented by the mixing level signal. The device 51 mixes the background green video signal G' and the superimposing green picture signal at a mixing rate corresponding to the mixing level represented by the mixing level signal. The device 52 mixes the background blue video signal G' and the superimposing blue picture signal at a mixing rate corresponding to the mixing level represented by the mixing level signal.

The analog superimposing color picture signals are also transmitted from the D/A converters 40-42 to first input terminals of the switches 60-62 respectively. Superimposed or processed color video signals outputted from the mixers 50-52 are applied to second input terminals of the switches 60-62 respectively. Output terminals of the switches 60-62 are connected to the display 26. When the mix-enabling signal ME applied to each of the control terminals of the switches 60-62 is "0", the output terminal is connected to the first input terminal but is separated from the second input terminal in each of the switches 60-62 so that the switches 60-62 directly pass the analog superimposing color picture signals from the D/A conveters 40-42 to the display 26. In this case, the output color video signals Ro, Go, and Bo from the switches 60, 61, and 62 are equal to the superimposing color picuture data R, G, and B respectively so that the related segments of the superimposing picture appear directly on the display 26. When the mix-enabling signal ME applied to each of the control terminals of the switches 60-62 is "1", the output terminal is connected to the second input terminal but is separated from the first input terminal in each of the switches 60-62 so that the switches 60-62 pass the superimposed color video signals from the mixers 50–52 to the display 26. In this case, the output color video signals Ro, Go, and Bo from the switches 60, 61, and 62 correspond to mixtures of the background color video signals R', G', and B', and the superimposing color picutre signals so that the mixures of the related segments of the background image and the superimposed picture appear on the display 26.

Figure 6:
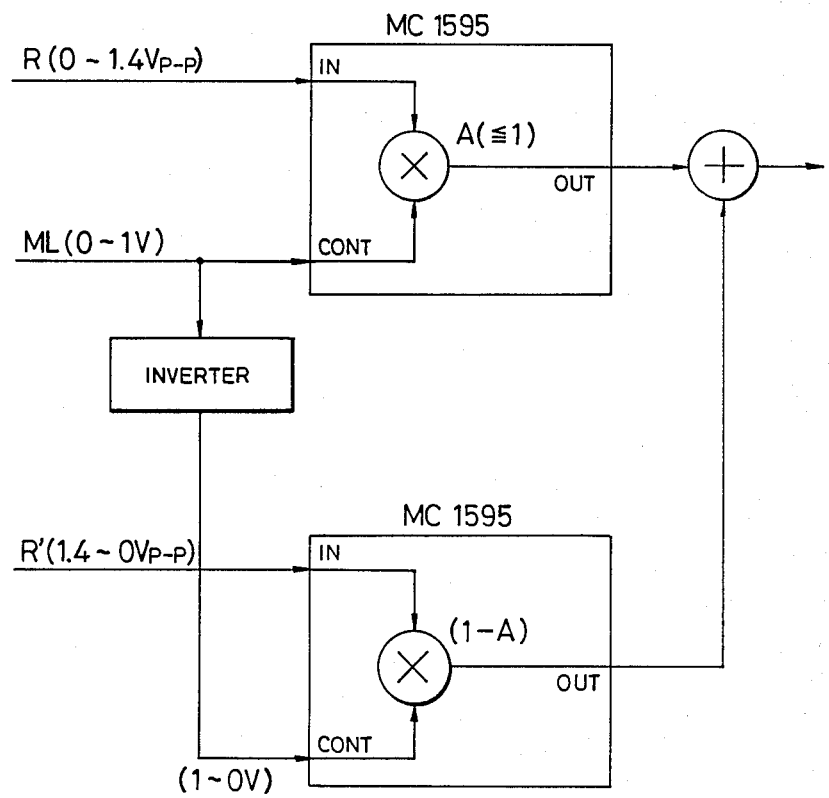
FIG. 6 is a block diagram of one of the mixers of FIG. 2.

It should be noted that each of the mixers 50–52 can be composed of commercially available analog multipliers such as two sets of Motorola Type MC 1595L four-quadrant multipliers. One of the multipliers the D/A converted color picture data R by a mixing rate A in response to a D/A converted signal ML, and another multipies the background color video signal R' by (1−A) in response to a signal complementary to the ML supplied thereto, and outputs from the two multipliers are summed together to form the output color video signal Ro as shown in FIG. 6.

The red data R, the green data G, and the blue data B in each of the picture elements of the superimposing picture data stored in the memory unit 30 have 8 bits, being variable among 256 different states identified by numbers 0–255 in decimal representation. The voltage of each of the analog superimposing color picture signals outputted by the D/A converters 40–42 is variable among 256 different potentials corresponding to the 256 different states of the superimposing color picture data. For example, the minimum and the maximum of the 256 different potentials of the analog superimposing color picture signals are 0 V and 0.84 V respectively. The 256 different potentials are separated at equal voltage intervals corresponding to 0.84/256 V.

The mixing level ML of each of the picture elements of the superimposing picture data stored in the memory unit 30 has 5 bits, being variable among 32 different states identified by numbers 0–31 in decimal representation. The combination of the D/A converter 43 and the mixer 50 is designed so that the mixing ratio between the background red video signal R' and the superimposing red picture signal varies in accordance with the mixing level ML. For example, when the mixing level ML is 31 in decimal representation, the output signal from the mixer 50 equals the background red video signal R'. When the mixing level ML is 0 in decimal representation, the output signal from the mixer 50 equals the superimposing red picture signal. As the mixing level ML increases from 0 to 31 in decimal respresentation, the percentage of the superimposing red picture signal in the output signal from the mixer 50 decreases while the percentage of the background red video signal R' in the output signal from the mixer 50 increases. The combination of the D/A converter 41 and the mixer 51, and the combination of the D/A converter 42 and the mixer 52 are designed in a manner similar to the combination of the D/A converter 40 and the mixer 50.

Figure 4:
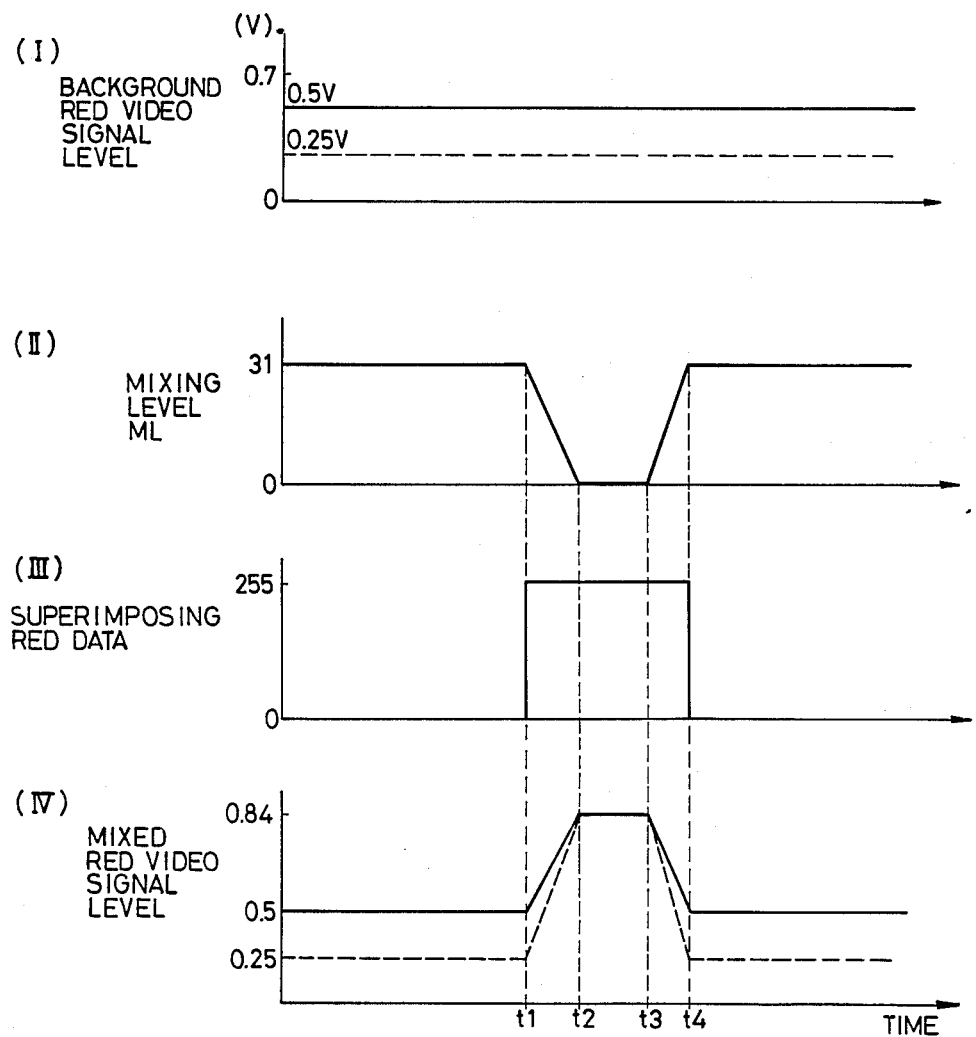
FIG. 4 is a timing diagram of video signals, mixing levels, and color superimposed data in the video signal processing apparatus of FIGS. 1 an 2.

It is assumed that, as shown in the part III of FIG. 4, the superimposing red picture data R varies in a rectangular form within an interval corresponding to one horizontal scanning line. Specifically, the superimposing red picture data R remains 0 in decimal representation until a point t1. At the point t1, the superimposing red picture data R changes from 0 to 255 in decimal representation. During a period between the point t1 and a later point t4, the superimposing red picture data R remains 255 in decimal representation which is equivalent to 0.84 volts. At the point t4, the superimposing red picture data R returns from 255 to 0 in decimal representation. After the point t4, the superimposing red picture data R remains 0 in decimal representation.

As shown in the part II of FIG. 4, the level variation of the mixing level ML is predetermined to vary the level of superimposing red picture data R. Specifically, the value of the mixing level ML remains 31 in decimal representation until the point t1. During a period between the point t1 and a subsequent point t2 which corresponds to an edge of the superimposed picture (see the part III of FIG. 4), the mixing level ML changes from 31 to 0 in decimal representation at a constant rate. During a period between the point t2 and a subsequent point t3 which corresponds to a central portion of the superimposed picture, the mixing level ML remains 0 in decimal representation. During a period between the points t3 and t4 which corresponds to another edge of the superimposed picture (see the part III of FIG. 4), the mixing level ML returns from 0 to 31 in decimal representation at a constant rate. After the point t4, the mixing level ML remains 31.

In cases where the mix-enabling signal ME remains "1" and the background red video signal R' remains at 0.5 V through the period corresponding to one horizontal scanning line as shown by the solid line in the part I of FIG. 4, the processed or mixed red video signal Ro remains at 0.5 V until the point t1 as shown by the solid line in the part IV of FIG. 4. Until the point t1, the mixing level ML continues to be 31 so that the mixed red video signal Ro equals the background red video signal R'. During the period between the points t1 and t2 which corresponds to an edge of the superimposing picture, the voltage of the mixed red video signal Ro changes from 0.5 V to 0.84 V at a constant rate in accordance with the predetermined variation in the mixing level ML as shown by the solid line in the part IV of FIG. 4. During the period between the points t2 and t3 which corresponds to a central portion of the superimposed picture, the mixed red video signal Ro remains at 0.84 V as shown by the solid line in the part IV of FIG. 4. During the period between the points t2 and t3, the mixing level ML remains 0 so that the mixed red video signal Ro equals the analog superimposed red picture signal corresponding to the superimposed red picture data R. During the period between the points t3 and t4 which corresponds to another edge of the superimposed picture, the voltage of the mixed red video signal Ro changes from 0.84 V to 0.5 V at a constant rate in accordance with the predetermined variation in the mixing level ML as shown by the solid line in the part IV of FIG. 4. After the point t4, the mixed red video signal Ro remains at 0.5 V as shown by the solid line in the part IV of FIG. 4. After the point t4, the mixing level ML continues to be 31 so that the mixed red video signal Ro equals the background red vide signal R'.

In cases where the mix-enabling signal ME remains "1" and the background red video signal R' remains at 0.25 V through the period corresponding to one horizontal scanning line as shown by the broken line in the part I of FIG. 4, the processed or mixed red video signal Ro remains at 0.25 V until the point t1 as shown by the broken line in the part IV of FIG. 4. Until the point t1, the mixing level ML continues to be 31 so that the mixed red video signal Ro equals the background red video signal R'. During the period between the points t1 and t2 which corresponds to an edge of the superimposed picture, the voltage of the mixed red video signal Ro changes from 0.25 V to 0.84 V at a constant rate in accordance with the predetermined variation in the mixing level ML as shown by the broken line in the part IV of FIG. 4. During the period between the points t2 and t3 which corresponds to a central portion of the superimposed picture, the mixed red video signal Ro remains at 0.84 V as shown by the solid line in the part IV of FIG. 4. During the period between the points t2 and t3, the mixing level ML remains 0 so that the mixed red video signal Ro equals the analog superimposed red picture signal corresponding to the superimposed red picture data R. During the period between the points t3 and t4 which corresponds to another edge of the superimposed picture, the voltage of the mixed red video signal Ro changes from 0.84 V to 0.25 V at a constant rate in accordance with the predetermined variation in the mixing level ML as shown by the broken line in the part IV of FIG. 4. After the point t4, the mixed red video signal Ro remains at 0.25 V as shown by the broken line in the part IV of FIG. 4. After the point t4, the mixing level ML continues to be 31 so that the mixed red video signal Ro equals the background red vide signal R'.

In this signal processing, the mixing is performed between two common color (R) analog signals, however, if the process is observed in terms of digital data flow before the D/A converters 40 and 43, one can understand that the process is performed picture element by picture element at every read out thereof from the memories RM and MM respectively, and the mixing rate for each red datum (picture element) is defined by the each corresponding ML datum read out from the memory MM. Further, the value of each corresponding ML datum is predetermined before being preloaded into the computer 24 as program data of a program such as "FONT GENERATOR" mentioned before.

Accordingly, as values of each mixing level ML are all predetermined, the time span between t1 and t2 for example, which involves a certain number of picture elements in the scanning line, is also predetermined. The same is true for the gradient or variation of the level change of the mixed red video signal Ro between t1 and t2 for example. And it should be noted that values of the mixing level ML are not subject at all to the level of the background red video signal R, and the mixed level of the background red video signal R is determined passively by the predetermined value of the mixing level ML according to the (1−A) multiplication at the mixer 50.

In this way, during the periods corresponding to the edges of the superimposed picture, the voltage of the mixed red video signal Ro varies gradually between the background level and the level of the central portion of the superimposed picture. These gradual variations in the mixed red video signal Ro prevent jagged red edges of the superimposed picture indicated on the display 26.

The relationship between the superimposing green picture data G and the mixing levels ML, and the relationship between the superimposing blue picture data B and the mixing levels ML are designed in a manner similar to the relationship between the superimposing red picture data R and the mixing levels ML. Accordingly, jagged edges of the superimposed picture indicated on the display 26 are prevented also in respect of green and blue.

The gradual variations in the mixed color video signals Ro, Go, and Bo during intervals corresponding to edges of the superimposed pictures are realized in real time with respect to the background singals being supplied via the arrangement including the mixers 40–42 so that jagged edges of the superimposed pictures indicated on the display 26 are prevented even in the case of moving backgrounds. It should be noted that FIG. 4 indicates the processed signals expressed in the time domain corresponding to one horizontal line, therefore, if observed along the horizontal line, picture elements lying along the horizontal line are processed on a one by one basis, as read out from the corresponding memories RM, GM, BM and MM.

Figure 5:
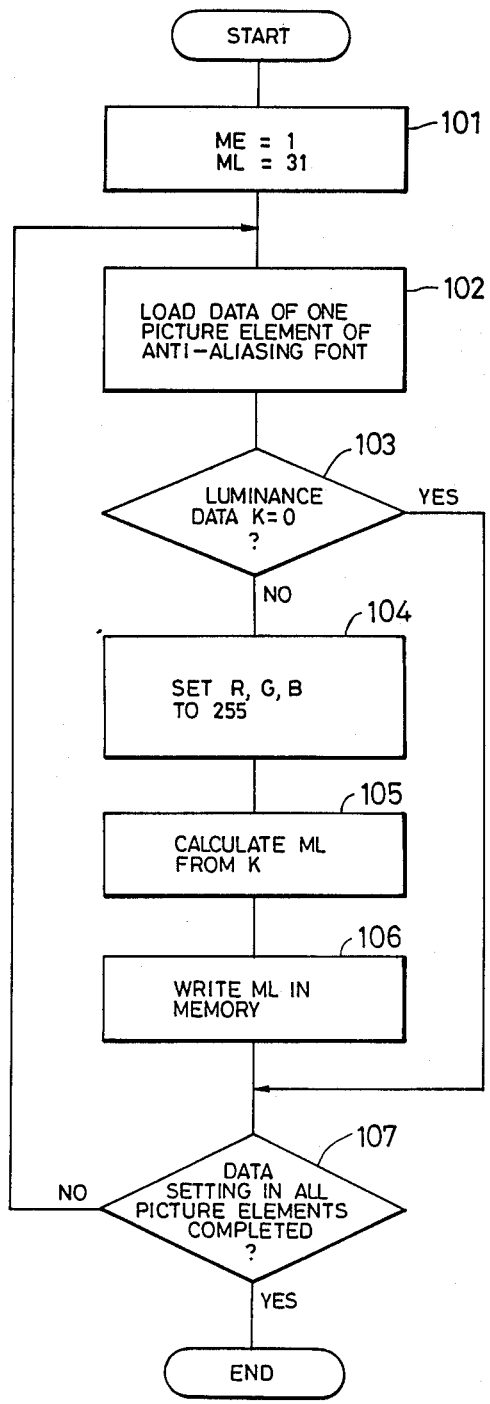
FIG. 5 is a flowchart of a program operating the computer (CPU) of FIG. 1.

The computer 24 operates in accordance with a program stored in a read-only memory (ROM) within the computer 24. FIG. 5 is a flowchart of the program.

As shown in FIG. 5, a first block 101 of the program sets all of the mix-enabling bits in the superimposition data memory MM to "1" so that the mix-enabling signal ME will continue to be "1". Furthermore, in the block 101, all of the mixing levels stored in the superimposition data memory MM are set to "31" at which the outgoing color video signals Ro, Go, and Bo are equal to the incoming color video signals R', G', and B' respectively. After the block 101, the program advances to a block 102.

The block 102 fetches data of one picture element of anti-aliasing font or picture from the ROM within the computer 24 or from an external memory unit such as a magnetic disc memory unit, and then stores the fetched data in a random-access memory (RAM) within the computer 24 for later uses. The fetched data includes luminance data K of one picture element of anti-aliasing font or picture. When the luminance data K are "0", the related points of the font or picture superimposed over the background by the display 26 are absent or invisible so that the only the background picture will appear. As the luminance data K increase from "0", the luminances of the related points of the superimposed font or picture increase. When the luminance data K are "7", the luminances of the related points of the superimposed font or picture are maximized. In a range corresponding to edges of the anti-aliasing font or picture, the luminance data K are preset so as to increase from "0" to "7" in the direction toward the center of the font or picture. In a range corresponding to a central portion of the anti-aliasing font or picture, the luminance data K are preset so as to remain "7".

A block 103 subsequent to the block 102 determines whether or not the luminance data K are "0". When the luminance data K are "0", the program jumps to a block 107. When the luminance data K are not "0", the program advances to a block 104.

The block 104 sets the color picture data in the memories RM, GM, and BM to preset values. In the case where the anti-aliasing font or picture is white, the color picture data are all set to "255".

A block 105 subsequent to the block 104 calculates the mixing level ML from the luminance data K by referring to the following equation.

$$ML = 31 - 31 \cdot K/7$$

After the block 105, the program advances to a block 106.

The block 106 writes the calculated mixing level ML into the superimposition data memory MM. After the block 106, the program advances to the block 107.

The block 107 determines whether or not the color data and the superimposition data of all the picture elements of the anti-aliasing font or picture have been set in the memory unit 30. When the data setting has not yet completed, the program returns to the block 102. When the data setting has been completed, the program ends.

Accordingly, the blocks 102-107 are reiterated until the color data and the superimposition data of all the picture elements of the anti-aliasing font or picture have been set in the memory unit 30. The cycles of execution of the blocks 102-107 correspond to the respective picture elemnts of the anti-aliasing font or picture.

What is claimed is:

1. A video signal processing apparatus comprising:
   (a) means for generating a superimposing video signal representing a superimposing image;
   (b) means for mixing the superimposing video signal and a background video signal at a variable mixing rate; and
   (c) means for varying the mixing rate during an interval where the superimposing video signal corresponds to an edge of the superimposing image,
   further comprising means for selecting either of the superimposing video signal and an output signal from the mixing means which represents a mixture of the superimposing video signal and the background video signal.

2. A video signal processing apparatus comprising:
   (a) means for generating a superimposing video signal representing a superimposing image;
   (b) means for mixing the superimposing video signal and a background video signal at a variable mixing rate; and
   (c) means for varying the mixing rate during an interval where the superimposing video signal corresponds to an edge of the superimposing image,
   further comprising a switch selecting either of the superimposing video signal and an output signal from the means for mixing which represents a mixture of the superimposing video signal and the background video signal.

3. A video signal processing apparatus comprising:
   (a) means for generating a superimposing video signal representing a superimposing image;
   (b) means for mixing the superimposing video signal and a background video signal at a variable mixing rate; and
   (c) means for varying the mixing rate during an interval where the superimposing video signal corresponds to an edge of the superimposing image,
   wherein said means for mixing comprises first input means for receiving said superimposing video signal representing a superimposing image, second input means for receiving said background video signal, output means for providing an output mixed signal comprising a mix of said superimposing video signal and said background video signal at a predetermined mixing ratio, and control input means for receiving a control signal to establish said predetermined mixing ratio,
   wherein said means for varying the mixing rate comprises means for generating said control signal as a varying signal to vary said predetermined mixing ratio
   further comprising switch means for selecting either of the superimposing video signal and an output signal from the means for mixing which represents a mixture of the superimposing video signal and the background video signal.

4. The apparatus of claim 3, further comprising comprises memory means for storing mixing enable signals for enabling said switch means to select said output signal from the mixer representing mixture of the superimposing video signal and the background video signal to provide to a display means, and address means for addressing said memory means to output said mixing enable signals to said switch means for each display element of said background video signal.

5. A video signal processing apparatus comprising:
   (a) means for generating a digital superimposing video signal representing a superimposing image;
   (b) digital-to-analog converting means for converting the digital superimposing video signal into a corresponding analog superimposing video signal;
   (c) an analog signal mixer means for mixing the analog superimposing video signal and an analog background video signal at a variable mixing rate; and
   (d) means for varying the mixing rate during an interval where the superimposing video signal corresponds to an edge of the superimposing image.

6. A video signal processing apparatus comprising:
   (a) a first memory;
   (b) means for storing a digital superimposing video signal into the first memory, the digital superimposing video signal representing a superimposing shape;
   (c) a first digital-to-analog converter;
   (d) means for supplying the digital superimposing video signal form the first memory to the first digital-to-analog converter, wherein the first digital-to-analog converter converts the digital superimposing video signal into a corresponding analog superimposing video signal;
   (e) a second memory;
   (f) means for storing a digital mixing rate signal into the second memory, the digital mixing rate signal representing mixing rates predetermined for respective segments of the superimposing shape, the mixing rates varying in a range corresponding to an edge of the superimposing shape;
   (g) a second digital-to-analog converter;
   (h) means for supplying the digital mixing rate signal to the second digital-to-analog converter, wherein the second digital-to-analog converter converts the digital mixing rate signal into a corresponding analog mixing rate signal;
   (i) an analog signal mixer;
   (j) means for supplying the analog superimposing video signal from the first digital-top-analog converter to the analog signal mixer;
   (k) means for supplying the analog mixing rate signal from the second digital-to-analog converter to the analog signal mixer; and
   (1) means for supplying an analog background video signal to the analog signal mixer;
   wherein the analog signal mixer mixes the analog superimposing video signal and the analog background video signal at a mixing rate represented by the analog mixing rate signal.

* * * * *